(12) United States Patent
Broer et al.

(10) Patent No.: US 7,547,402 B2
(45) Date of Patent: Jun. 16, 2009

(54) FLEXIBLE FOIL MOVEABLE BY MEANS OF LIGHT

(75) Inventors: Dirk Jan Broer, Eindhoven (NL); Christiane Maria Rosette De Witz, Eindhoven (NL); Grietje Neeltie Mol, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 344 days.

(21) Appl. No.: 10/597,582

(22) PCT Filed: Jan. 26, 2005

(86) PCT No.: PCT/IB2005/050311

§ 371 (c)(1),
(2), (4) Date: Jul. 31, 2006

(87) PCT Pub. No.: WO2005/075604

PCT Pub. Date: Aug. 18, 2005

(65) Prior Publication Data

US 2008/0258108 A1   Oct. 23, 2008

(30) Foreign Application Priority Data

Feb. 4, 2004   (EP) ................................. 04100407

(51) Int. Cl.
*C09K 19/38* (2006.01)
*C09K 19/60* (2006.01)
*G02F 1/03* (2006.01)

(52) U.S. Cl. .............................. 252/299.01; 252/299.1; 359/241

(58) Field of Classification Search ............ 252/299.01, 252/299.1; 428/1.1, 1.3; 349/88; 359/227, 359/238, 241
See application file for complete search history.

(56) References Cited

U.S. PATENT DOCUMENTS 5,668,614 A * 9/1997 Chien et al. ................. 349/115
5,686,153 A * 11/1997 Heynderickx et al. ...... 428/1.32

OTHER PUBLICATIONS

Ikeda et al., "Anisotropic Bending and Unbending Behavior of Azobenzene Liquid Cyrtalline Gels by Light Exposure", Advanced Materials 2003, vol. 15, No. 3, pp. 201-205.*

* cited by examiner

*Primary Examiner*—Shean C Wu

(57) ABSTRACT

A flexible foil which is moveable by light includes a dye which is capable of changing shape when absorbing light of a predetermined wavelength. The dye is dispersed in the foil such that, near at least one major surface of the foil, the dye is anisotropically oriented. Transverse to the foil, the concentration and/or orientation of the dye changes in an asymmetric manner. The change in orientation and/or concentration is such that, when exposed to light of the predetermined wavelength, the flexible foil moves. When exposed the dye changes shape which change in shape causes a change in lateral dimension of the foil which change in lateral dimension is, due to the change in concentration and/or orientation of the dye, different at different locations with the foil. This causes the flexible foil to move or more particular bend.

20 Claims, 2 Drawing Sheets

FLEXIBLE FOIL MOVEABLE BY MEANS OF LIGHT

The invention relates to a flexible foil which is moveable by means of light.

A foil as mentioned in the opening paragraph is disclosed by Ikeda et al in Adv. Mat. 2003, 15 no 3, pages 201-205. The foil disclosed therein is made of an azo-benzene liquid-crystalline gel which, when exposed to light, bends or unbends anisotropically. The foil includes anisotropically oriented trans-azo-benzene moieties which undergo trans-cis isomerization when exposed to light of the appropriate wavelength. The cis and trans isomers have a different shape. To bring about bending (or unbending) the foil is exposed to light such that substantially all incident light is absorbed by the trans-azo-benzene moieties in a surface region of the foil leaving the bulk of the foil unexposed. Accordingly, in the surface region the dye changes shape whereas in the bulk of the foil it does not. The change in shape of the dye leads to a volume contraction selectively along one direction in the surface region whereas the volume of the bulk does not change which causes the foil to bend.

The known foil has disadvantages. To establish a sufficiently steep gradient in absorption the foil entirely consists of dye. Since the dye is reactive towards ambient light, such a high concentration of dye is expected to limit lifetime. Moreover, as a result of the dye concentration gradient substantial thermal stress is expected to develop during operation also limiting lifetime. Furthermore, since the bulk of the foil is unaffected the magnitude of the bending is limited. Increasing the intensity of radiation does not help to increase the magnitude of bending because this makes azo molecules deeper in the layer also contract in the same direction. This reduces the magnitude of bending.

It is an object of the invention to, inter alia, provide a flexible foil which is moveable by means of light. The foil is to be capable of providing a movement of large magnitude and, if desired, using a reduced dye loading.

These and other objects are achieved with a flexible foil which is moveable by means of light, comprising a dye which is capable of changing shape when absorbing light of a predetermined wavelength, the dye being anisotropically oriented near at least one major surface of the foil and exhibiting, transverse to the foil, an asymmetric change in concentration and/or orientation, such that the foil moves when absorbing light of a predetermined wavelength.

When the dye absorbs light of the predetermined wavelength it changes shape, causing it to occupy more space in certain directions and less space in others. Because near at least one major surface the dye is anisotropically oriented, such orientation being on a macroscopic scale, the anisotropically oriented dye molecules cooperate to provide a change in dimension of the foil on a macroscopic scale in at least one lateral direction of the foil. The extent of the change in dimension depends inter alia on the concentration and/or orientation of the dye. Because the flexible foil shows an asymmetric change in concentration and/or orientation transverse to the foil, the change of dimension in the at least one lateral direction changes asymmetrically transverse to the foil. Since the foil is flexible, the changes in dimension are translated into a movement or more particular a deformation of the foil. Having, transverse to the foil, a monotonic variation in the change in lateral dimension, either gradual or in discrete steps, a bending movement obtains. The foil is thus moveable or more particular deformable.

Because the orientation and/or concentration of the dye changes transverse to the foil, the foil in accordance with the invention can move or more particular bend without a need to absorb all light incident on the foil in a surface region of the foil. Thus, the dye loading (concentration) can be reduced. Having a reduced dye loading not only lowers the photochemical reactivity of the foil under ambient light by also reduces the thermal stress developed within the foil. Furthermore, because light absorption can take place across the entire foil thickness lateral changes in dimension can take place across the entire foil thickness as opposed to such changes being limited to the surface region, the magnitude of the movement can be larger or, at a given magnitude of movement, the dye loading reduced.

In the context of the present invention, the term "light" means any actinic radiation including but not limited to e-beam and gamma-ray and X-ray radiation and other electromagnetic radiation such as ultraviolet, visible and infrared light.

In the context of the invention, the term "dye" is short for a dye capable of changing shape when subjected to light of a predetermined wavelength. The term "dye" means a single dye compound or a mixture of dyes.

By controlling the change in dye concentration and/or orientation, the movement of the foil can be controlled. Reducing the concentration or degree of orientation of the dye results in a change in dimension which is less pronounced. Changing the direction of orientation while not necessarily reducing the degree of orientation typically results in at least one direction exhibiting a less pronounced change in dimension and at least another a more pronounced change in dimension.

In principle any dye which changes shape can be suitably used in accordance with the invention. Many examples are known in the art as such. For example dyes relying on photocleavage or photo-elimination may be used. However the effect of such dye is typically not reversible. It is preferred to have a flexible foil which is reversibly moveable. To this end, in an embodiment, the dye is capable of changing from a first shape to a second shape when absorbing light of the predetermined wavelength, and capable of changing from the second shape to the first shape by means of light of a different wavelength than the predetermined wavelength or by means of heat or combination thereof, rendering the foil reversibly moveable.

To obtain a reversible change in shape, photo-isomerizable dyes can be used.

In a more particular embodiment, the dye is an azo-benzene dye.

Such azo-benzene dyes can be easily oriented anisotropically, optionally in conjunction with liquid crystals and have a high extinction coefficient.

Large amplitude movement may be achieved if the dye is dispersed in a polymerized liquid crystal.

In the context of the invention, the term "polymer" encompasses but is not limited to linear or a (slightly) crosslinked polymer, oligomer, homopolymer, copolymer, terpolymer and higher homologues, linear polymers, side chain and main chain, polymer blends.

In the context of the invention, the term "polymerized liquid crystal" includes but is not limited to liquid crystal polymers and polymers obtained by polymerizing polymerizable liquid crystals. A polymerized liquid crystal may be obtained from a single liquid crystal compound or a mixture comprising several such compounds and may contain further components.

Use of oriented polymerized liquid crystal facilitates orientation of the dye, amplifies the change in size brought about by the change in shape of the dye, and/or enables the use of those dyes which are as such not liquid crystalline. Polymerized liquid crystals facilitate a large degree of anisotropic orientation. If subjected to non-mechanical means above $T_g$, contraction in a lateral dimension of the foil may be realized enabling a large magnitude (un)bending movement. Such materials are known in the art as such and include liquid crystal polymers and polymers obtained by polymerizing polymerizable liquid crystals in the oriented state.

Use of photo-polymerizable liquid crystal is advantageous in forming patterned polymerized liquid crystals by means of patterned light exposure e.g. via a mask.

Many different embodiments of the change in concentration and/or orientation exist.

In a first embodiment, the foil comprises a stack of layers having a concentration and/or an orientation of the dye which differs between different layers of the stack.

In a second embodiment, the concentration and/or orientation of the dye changes gradually.

The change in orientation may involve a change in the degree of orientation or a change in the direction of the average direction of orientation.

An attractive embodiment is one wherein the dye is splay oriented with a planar orientation near one major surface of the foil and a homeotropic orientation near another major surface opposite the one major surface.

In a splay orientation a gradual variation transverse to the foil exists, a change from a homeotropic alignment at one major surface to a planar orientation at another, opposite to the one, major surface. Splay orientation may be used for calamitic and discotic liquid crystals.

The flexible foil in accordance with the invention converts light into mechanical movement. The mechanical movement may be used to move or exert force on objects or may be used to provide a moveable barrier separating selected spatial regions. In all such cases, it is advantageous to attach the flexible foil to a structure such as a substrate which is fixed with respect to the movement of the foil.

In a particular embodiment the flexible foil is a valve switchable between a closed and an open state. In a general sense the valve may serve as a barrier for matter such as a fluid or radiation such as light.

These and other aspects of the invention will be apparent from and elucidated with reference to the drawings and the embodiments described hereinafter.

The flexible foil 1, when in the flattened state subjected to light hv of predetermined wavelength $\lambda_1$, moves bringing the flexible foil in the bent state. Although not essential for the invention in a broad sense, the movement is reversible. When the flexible foil 1 in the bent state is exposed to light hv of wavelength $\lambda_2$, $\lambda_2$ being different from $\lambda_1$, or to an effective heat treatment $\Delta$ or a combination thereof, the foil reverts back to its flattened state.

Figure 1:
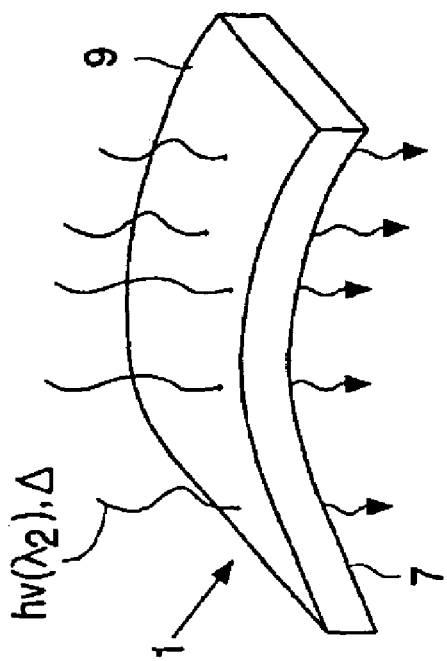
FIG. 1 shows, schematically, a perspective view of an embodiment of a flexible foil in accordance with the invention in a flattened and a bent state.
Figure 1:
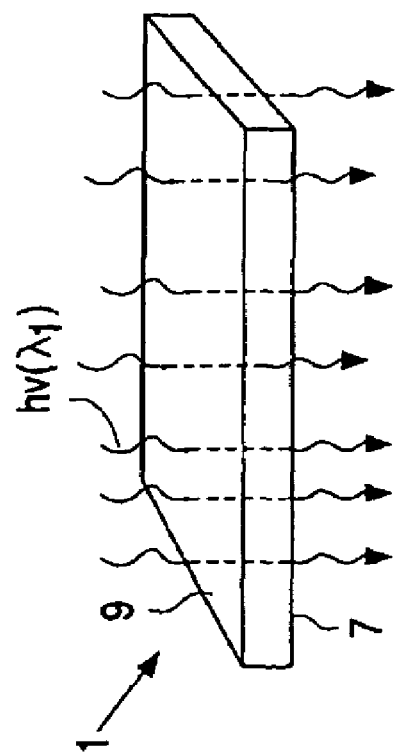
Figure 2:
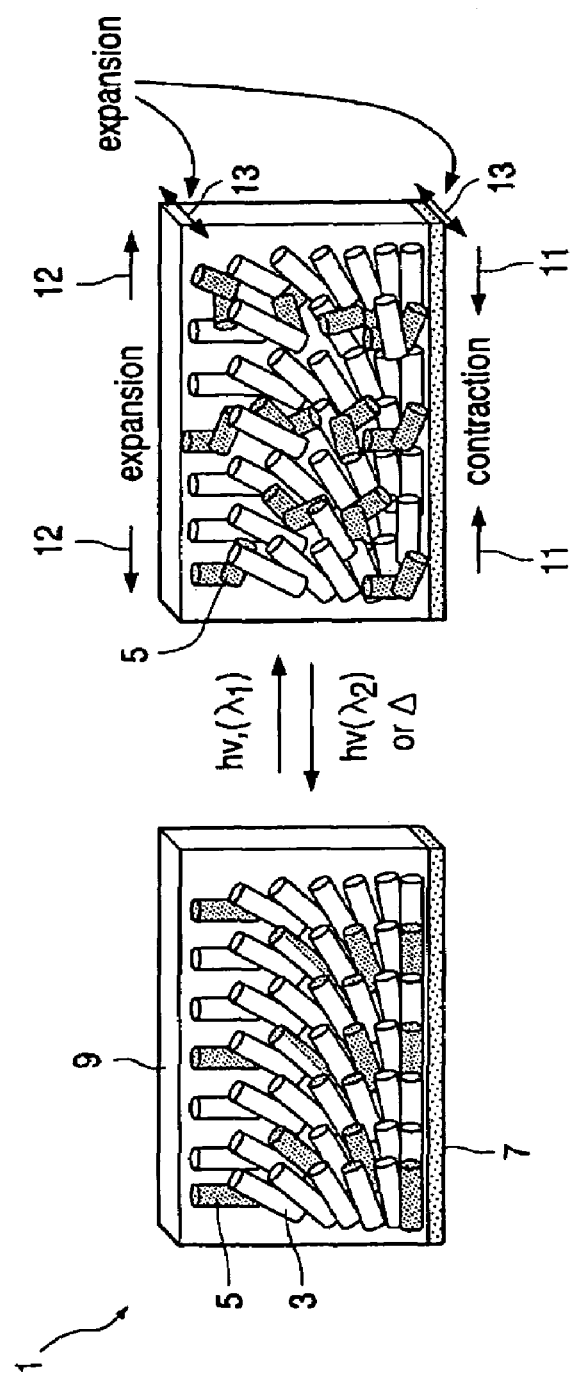
FIG. 2 shows, schematically, a magnification of the flattened and bent state shown in FIG. 1.

FIG. 2 shows, schematically, a magnification of the flattened and bent state shown in FIG. 1.

FIG. 2 shows on a molecular scale how the movement of the flexible foil in response to light is brought about.

The flexible foil 1 is formed of a polymerized liquid crystal having oriented rod-shaped molecular units 3.

As indicated above, the term "polymerized liquid crystal" includes liquid crystal polymers and polymers obtained by polymerizing polymerizable liquid crystals. Both types of polymers are as such well known in the art. Oriented liquid crystal polymers can be obtained by heating the polymer above its clearing point and then cooling down below that temperature while being subjected to orientation means. Oriented polymerized liquid crystals can also be manufactured by orienting a polymerizable liquid crystal and then polymerizing the liquid crystal while maintaining the orientation.

A dye having rod-shaped molecular units 5 capable of changing shape (from a rod-like conformation to a bent conformation) when absorbing light of wavelength $\lambda$, is dispersed in the polymerized liquid crystal.

The polymerized liquid crystal and the dye, which is aligned with the polymerized liquid crystal, are anisotropically oriented in a splay orientation (splay is not essential other orientations can also be used). At the major surface 7 the rod-shaped units 3 and 5 are aligned planar that is with its long axis oriented on average parallel to the surface 7. At the major surface 9 the rod-shaped units 3 and 5 are oriented homeotropically, that with their long axis oriented on average perpendicular to the major surface 9. In traversing the foil from one major surface to another the average orientation of the long axes of the units 3 and gradually changes from one orientation to another.

In the embodiment shown in FIGS. 1 and 2, the dye and polymerized liquid crystal structural units are rod-shaped but this is by no means essential. For example, disc-shaped moieties and units may also be used.

The shown splay orientation may be obtained using conventional means as such. For example, the planar orientation may be obtained using orientation layers (alignment layers), such as a rubbed polyimide or obliquely sputtered silicon-dioxide layer. A homeotropic orientation can be obtained using an orientation layer functionalized with surfactants or against air by including specific surfactants in the composition to be oriented. Liquid crystals which promote formation of homeotropic orientation may also be used. Orientation may be effected by dispersing the composition to be oriented between two substrates, each substrate being with an orientation layer or a single substrate provided with a layer of the composition to be oriented, the layer interfacing with air. The orientation layer may also be patterned for example using known photo-alignment methods.

After having been exposed to light of wavelength $\lambda_1$, the anisotropically rod-shaped dye units 5 have changed into a shape which is less rod-shaped e.g. bent, thus requiring less space in directions along which the longitudinal axis of the rod-shaped units 5 were originally aligned and requiring more space in directions orthogonal thereto. Because the orientation of the dye extends on a macroscopic scale (monodomain or multi-domain), the dye molecules cooperate to bring about a macroscopic change of shape of the foil. In particular, near the major surface 7 in the direction of orientation contraction takes place as indicated by the arrows 11, whereas in the lateral direction perpendicular thereto expansion occurs as indicated by the double-headed arrow 13. Adjacent the major surface 9, expansion takes place in all lateral directions as indicated by the arrow 12. At positions further inward, the change in dimension is intermediate between the change observed at major surfaces 7 and 9. The net result of the change in dimension is a bending movement towards the major surface where contraction occurs, that is major surface 7.

The movement of the foil is enabled by means of an asymmetry in the anisotropy of the foil in directions transverse to the foil. It is not necessary (but may be used in addition if desired) that a light intensity gradient is set up within the foil to bring about movement.

The polymerized liquid crystal facilitates orientation of the dye. In fact, use of polymerized liquid crystal allows a dye to be used which is as such not liquid crystalline. The dye units 5 can be non-reactive in the sense that the units are dispersed as molecules in the polymerized liquid crystal. Alternatively or additionally dye units 5 may be covalently bonded to the polymerized liquid crystal. This may be achieved using dyes having one or more reactive groups capable of co-reacting with the reactive groups of the polymerizable liquid crystals form which the polymerized liquid crystal is obtained.

The polymerized liquid crystal also facilitates the movement of the foil, in particular if the light exposure is carried out above $T_g$ of the polymer. Above $T_g$, the polymerized liquid crystal has sufficient flexibility to have its orientation disturbed by the dye thus contributing to the expansion and contraction of the foil.

Instead of a calamitic (rod-shaped) polymerized liquid crystal also a disc-shaped polymerized liquid crystal in combination with a disc-shaped dye may be used. A splay orientation of disc-shaped structural units exhibits, at the homeotropic side, contraction in all lateral directions and, at the planar side, expansion in the direction of the central axis of the disc and contraction in the lateral dimension orthogonal thereto.

In principle any dye which changes shape upon exposure can be suitably used in the foil in accordance with the invention. Many examples are known in the art. Dyes which rely photo-cleavage or photo-elimination to change shape may be used Examples can be found in U.S. Pat. No. 5,668,614.

To obtain a reversible change in shape of the dye, photo-isomerizable dyes can be used. Such dyes are known in the art per se. Particularly suitable are those which cis-trans (E-Z) photo-isomerizable.

The dye may be disc-shaped. The dye may also be formed of rod-shaped moieties. The dye can be dispersed in an anisotropically oriented polymer such as a polymerized liquid crystal or a uniaxially stretched polymer.

A suitable rod-shaped dye is one of the formula I

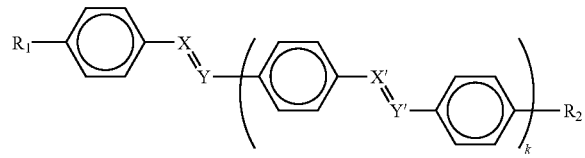

wherein
X, Y, X' and Y' are, the same or different, C or N;
k=0 or 1;
$R_1$ and $R_2$ are, the same or different, a spacer, such as in particular H, halogen, CN, $CF_3$, $N(R)_2$, $C_1$-$C_{20}$ alkyl or alkoxy, or phenyl. Preferably X=Y=X'=Y'=N.

When the trans isomer is exposed to light of an appropriate wavelength, the cis isomer is formed. The cis isomer is typically not rod-shaped but bent.

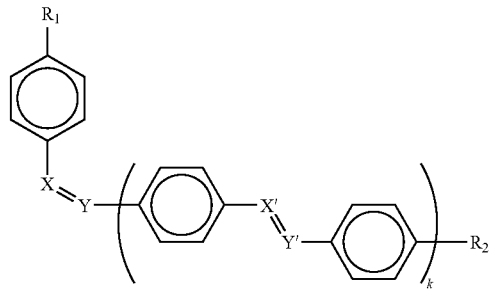

If the cis isomer is exposed to light which is absorbed more by the isomer than the trans isomer, the cis isomer is converted into the trans isomer. To facilitate isomerization heat may be supplied.

Polymerizable variants of these dyes may be made by using spacers which have at the terminal positions a polymerizable group such as a (meth)acrylate, a thiolene, an epoxide or a vinylether. Isomers other than cis-trans isomers may also be used, such as the α-hydrazono-beta-ketoesters of formula IIa and IIb.

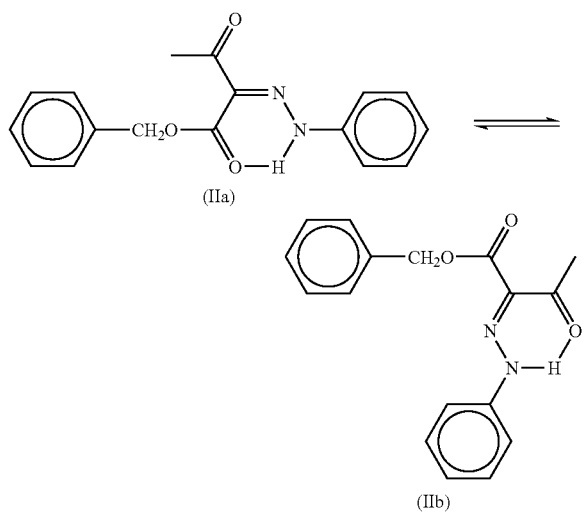

The phenyl rings in the formulas I, IIa and IIb may be unsubstituted or (further) substituted so as to, for example, tune the wavelength at which the conversion of one isomer into another takes place.

The absorption spectrum of the two isomers is usually different. This difference can be used to make the photo-isomerization reversible. Thus exposing the cis isomer at a wavelength where the cis isomer selectively absorbs the trans isomer is formed and vice versa Heat may also used to convert a high-energy isomer (usually the trans) into a low-energy isomer (usually the cis).

Dyes which exist as tautomeric isomers may also be suitably used.

Preferred are azo-benzene dyes such as the dyes of formula I wherein X=Y=N and/or, if k=1, X'=Y'=N.

Azo-benzene dyes are well-known highly absorbing dyes and are available in a wide variety. Azo-benzene dyes are typically rod-shaped allowing such dyes to be anisotropically oriented easily either as such or in combination with other materials such as polymerizable liquid crystals or liquid crystal polymers.

The dye may be combined with other materials. This is for example convenient if the dye as such is not liquid crystalline and cannot be oriented as such. In order to facilitate orientation, the dye may be dispersed in an anisotropically oriented polymer. Polymeric materials have excellent resilient properties allowing movement of large magnitude and are, compared to inorganic foils, facile and cost-effective to manufacture, not only if the foil is of large area (for example surface area in the order of about 0.01 to 1 $m^2$ or larger) but also if the foil has a small area, where small means the micrometer to millimeter domain. The polymer may be linear or a (slightly) crosslinked polymer. The term "polymeric material" or "polymer" includes oligomer, homopolymer, copolymer, terpolymer and higher homologues, linear polymers, side chain and main chain, polymer blends.

Suitable polymers may have an elastic modulus which is high, e.g. about 1 GPa or more, or low, e.g. about 10 MPa or less, in the art referred to as an elastomer or more particular a liquid-crystalline elastomer. For many applications a modulus of about 5 MPa to about 2 GPa is suitable.

Anisotropically oriented polymeric materials are known in the art as such and include uniaxially or biaxially stretched polymeric material.

Polymerized liquid crystals may also be used. Such materials are known in the art as such and include liquid crystal polymers and polymers obtained by polymerizing polymerizable liquid crystals. Polymerizable liquid crystals typically are liquid crystals carrying one or more polymerizable groups. If provided with two or more polymerizable groups cross-linked polymerized liquid crystals are obtained.

Polymerizable liquid crystals may be photo-polymerizable and/or crosslinkable. Preferred polymerizable liquid crystals are (meth)acrylates, thiolenes, vinylethers, oxetanes and epoxides.

The dye may be dispersed as a separate substance or may be co-polymerized with the polymer. If the polymer is obtained by polymerizing polymerizable liquid crystals, a polymerizable dye may be used to obtain a polymer having a co-polymerized dye.

Needless to say, the dye itself may be the polymerized liquid crystal.

Suitable polymerizable dyes are those of formula I wherein $R_1$ and/or $R_2$ is a (photo-)polymerizable group. Examples include the dyes Further examples of suitable polymerizable LC dyes are disclosed by Ikeda et al., supra.

In the embodiment shown in FIG. 1, the foil is formed of a single layer wherein the dye is splay oriented. The splay orientation is but one embodiment of a gradual variation in direction of orientation transverse to the layer. Another embodiment of a single layer exhibiting a variation in direction of orientation transverse to the foil is a twisted nematic orientation.

In a particular embodiment, the flexible foil has a twisted nematic orientation. By making use of a polarized light, and dependent on the retardation of the foil, a foil having a twisted nematic orientation can be made to bend towards or away from the polarized light source.

A gradual variation in a single layer may also be achieved using a variation in the degree in orientation. For example, in one embodiment the orientation may gradually change from a planar or homeotropic orientation at one major surface to an isotropic orientation at the major surface opposite thereof.

In an embodiment, the dye is dispersed in the foil in accordance with a concentration gradient, for example at one major surface a high concentration, and at a major surface opposite thereof a low concentration.

Instead of the variation being implemented in a single layer, the variation may also be achieved using a stack of layers. Within each layer of the stack the orientation (direction or degree) and/or concentration may be constant or vary.

In a simple form, the stack consists of two layers at least one of which comprises anisotropically oriented dye. The other layer may then be a layer having a lower concentration of dye, preferably one having no dye at all. The other layer may have dye which is oriented to a lesser extent, or more particular isotropically oriented. The other layer may also contain anisotropically oriented dye oriented in a different direction. For example, the at least one layer may be planar oriented in one lateral direction and the other layer planar oriented in a direction orthogonal to said one lateral direction. The other layer may also be homeotropically oriented.

Needless to say, in order to realize a multi-layered embodiment the materials which suitable to obtain the splay oriented foil 1 may also used. For example, both rod-shaped and disc-shaped dyes and liquid crystals may be used.

The thickness of the foil is not critical, be it that the magnitude of movement generally increases when the foil is made thinner. For many applications, a thickness of about 2 mm or less is suitable, others may benefit from a thickness less than about 1 mm, or less than about 500 μm. In micro-mechanical

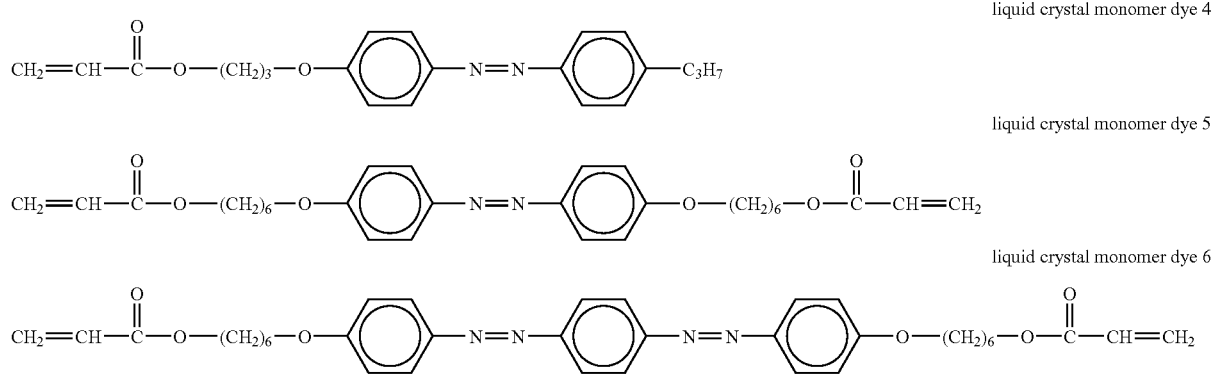

applications for example the thickness may be even less, for example, in a range of 0.1 μm to about 100 μm.

Some applications may benefit from a foil which does not have a constant thickness such as a wedge-shaped foil.

The width and length of the foil is not critical and is basically determined by the application. Width and length may be anything in a range from about 1 μm to about 1 m. The length and width of micro-mechanical foils will be in a range from about 1 μm to about 1000 μm.

The flexible foil in accordance with the invention converts light into mechanical movement. The mechanical movement may be used to move or exert force on objects or may be used to erect a moveable barrier (a valve) between selected spatial regions. In all such cases, it is advantageous to attach the flexible foil to a structure such as a substrate which is fixed with respect to the movement of the foil.

The flexible foil may have one or more distinct sections which are moveable by light individually or in unison.

The foil may be attached to a structure via an interior portion of the foil allowing a (concerted) movement on both sides of the point of attachment. Alternatively, an end portion of the foil may be attached to the structure thus maximizing the magnitude of foil movement. Any combination thereof is also possible. If needed in addition the structure may include guiding and/or supporting members which guide and/or support the foil or its movement. When attached to a surface, the foil may make any angle with such surface; it may be attached perpendicular or substantially parallel to the surface optionally via a raised support.

The foil in accordance with the invention has many applications.

It may be used as an actuator, that is a device for displacing objects or setting other objects in motion. The movement may be converted into electric energy by attaching a metal object to the foil and move the metal object in and out a coil. The induction in the coil sets up an electrical current. The foil may also be used to exert force. Specifically, a voltage can be generated if the foil exerts force against a piezoelectric material if the foil is made to exert a force against a piezoelectric material.

In another embodiment, the foil functions as a valve which is reversibly moveable (switchable) by non-mechanical means between an open and a closed state. Such a valve, which in a broad sense may be regarded as a moveable barrier separating selected spatial regions, has many interesting uses. In a first use, the valve is a shutter or closing means for shutting out or closing in matter such as a gas or a liquid or radiation such as light. The shutter may be used to shield a structure from ambient matter such as a gas or a liquid or radiation. Alternatively, the valve may be used as a means to prevent matter or radiation from escaping into the ambient. In particular the valve may form the closing means of a container. Such a container may for example contain a therapeutically active compound which compound can then, by means of light, released in a controlled manner. Also, the valve can be used for controlling transmission or reflection of light. In the latter case, the valve may obscure or expose a light-reflective surface arranged or may be itself be reflective. Smart windows with integrated optical devices and photo-actuators for optical communications systems are suitable applications of the foil in accordance with the invention.

In many applications it is desirable to have a plurality of foils in accordance with the invention arranged on a single substrate in accordance with a desired pattern. If each such foil is non-mechanically moveable individually, applications such as displays can be realized.

EXAMPLE

A free-standing flexible foil in accordance with the invention is manufactured as follows:

A polymerizable liquid crystal of the following composition is prepared:
  30 wt % LC monomer 1
  30 wt % LC monomer 2
  38 wt % trans isomer of azo-benzene LC monomer dye 4
  2 wt % photo-initiator, consisting of a 1:1 w/w mixture of Rose Bengal and N-phenylglycine.

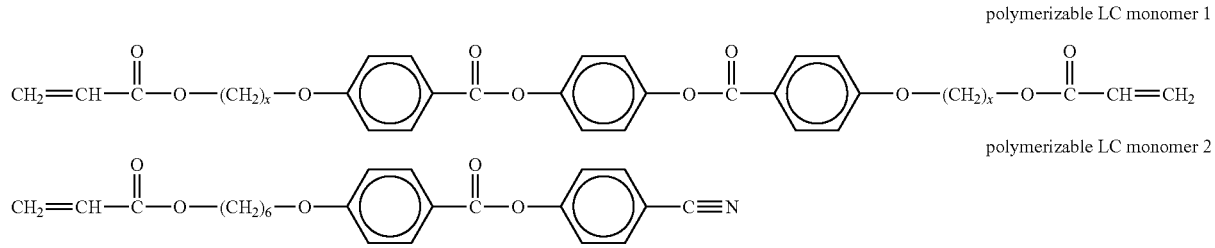

The polymerizable liquid crystal is dissolved in toluene to obtain a 20 parts by weight solution. The solution is spin coated on a glass plate provided with a rubbed polyimide layer. The rubbed layer induces a planar orientation. The polymerizable LC monomer 2 is known in the art to induce a homeotropic orientation at the liquid crystal air surface when added in an effective amount to a liquid crystal composition. After spin coating, the film is heated to 80° C. and kept at this temperature for 5 minutes. During this time the toluene evaporates and the polymerizable liquid crystal mixture aligns in a mono-domain structure. The film thus obtained has a thickness of about 2 μm (can be made thinner or thicker by adjusting the concentration and spinning conditions; thinner films in general are very fragile and difficult to handle in a free-standing fashion). The length of the film is 10 mm in the direction of orientation near the substrate and the width is 2 mm. Upon cooling the wet film to 30° C., the polymerizable liquid crystal, and thus the LC monomer dye 4 which is component thereof, becomes splay oriented with a planar orientation at polyimide surface and a homeotropic orientation at the air surface. At 30° C., the polymerizable liquid crystal film is polymerized by exposure with white light with a cut-off filter at 420 nm in a nitrogen atmosphere. The cut-off filter is used to suppress E-Z isomerization during the polymerization; E-Z isomerization adversely affects the degree of order.

The composition of the photo-initiator is selected such at that these exposure conditions polymerization is facilitated but E-Z isomerization of the LC monomer dye 4 is prevented.

After polymerization, a polymerized liquid crystal layer is obtained. The layer is peeled off the substrate to yield a flexible free-standing foil in accordance with invention. The free-standing foil is slightly warped, radius of curvature 240 mm. Since the splay orientation is preserved during polymerization, the flexible foil has a splay orientation. At the major surface which interfaced with the substrate, the now polymerized azo-benzene dye is oriented planar while at the opposite surface the orientation of the azo-benzene dye is homeotropic.

To test whether the flexible foil is moveable, the free-standing flexible foil is exposed to light having a wavelength of 365 nm from a Philips SP10 lamp at 20 cm distance. Within an exposure time of 20 seconds, the flexible foil bends into a rolled-up state with a bending radius of 11 mm. Heating the rolled up foil to 120° C. and subsequent cooling to room temperature causes the foil to unroll to a state having a bending radius of about 220 mm, which is very close to the initial curvature.

The process of bending and unbending can be repeated many times further demonstrating the flexible foil's reversible moveability.

The invention claimed is:

1. A flexible foil which is moveable by light, comprising a dye which is capable of changing shape when absorbing light of a predetermined wavelength, the dye being anisotropically oriented near at least one major surface of the foil and exhibiting, transverse to the foil, an asymmetric change in concentration and/or orientation, such that the foil moves when absorbing light of a predetermined wavelength by contraction along a first surface and expansion along a second surface.

2. The flexible foil as claimed in claim 1 wherein the dye is capable of changing from a first shape to a second shape when absorbing the light of the predetermined wavelength, and capable of changing from the second shape to the first shape by absorbing light of a different wavelength than the predetermined wavelength or by heat or combination thereof, rendering the foil reversibly moveable.

3. The flexible foil as claimed in claim 2 wherein the dye is a photo-isomerizable dye.

4. The flexible foil as claimed in claim 3 wherein the dye is an azo-benzene dye.

5. The flexible foil as claimed in claim 1 wherein the dye is dispersed in a polymerized liquid crystal.

6. The flexible foil as claimed in claim 1 further comprising a stack with layers having a concentration and/or an orientation of the dye which differs between different layers of the stack.

7. The flexible foil as claimed in claim 1 wherein the concentration and/or orientation of the dye changes gradually.

8. The flexible foil as claimed in claim 7 wherein the dye is splay oriented with a planar orientation near the at least one major surface of the foil and a homeotropic orientation near another major surface opposite the at least one major surface.

9. The flexible foil as claimed in claim 1 wherein the flexible foil is attached to a structure which is fixed relative to the movement of the foil.

10. The flexible foil as claimed in claim 9, wherein the flexible foil is a valve switchable between a closed and an open state.

11. The flexible foil of claim 1, wherein absorption of the light takes place across an entire thickness of the foil and lateral changes take place across the entire thickness.

12. A flexible foil comprising a dye which is capable of changing shape when absorbing light of a predetermined wavelength, the dye being anisotropically oriented near at least one major surface of the foil and exhibiting, transverse to the foil, an asymmetric change in concentration and/or orientation, wherein absorption of the light takes place across an entire thickness of the foil and lateral changes take place across the entire thickness.

13. The flexible foil of claim 12, wherein the foil moves when absorbing the light by contraction along a first surface and expansion along a second surface.

14. The flexible foil of claim 12, wherein the dye is capable of changing from a first shape to a second shape when absorbing the light, and capable of changing from the second shape to the first shape by means of light of a different wavelength than the predetermined wavelength or by means of heat or combination thereof, rendering the foil reversibly moveable.

15. The flexible foil of claim 12, wherein the dye is a photo-isomerizable dye.

16. The flexible foil of claim 12, wherein the dye is an azo-benzene dye.

17. The flexible foil of claim 12, wherein the dye is dispersed in a polymerized liquid crystal.

18. The flexible foil of claim 12, further comprising a stack with layers having a concentration and/or an orientation of the dye which differs between different layers of the stack.

19. The flexible foil of claim 12, wherein the concentration and/or orientation of the dye changes gradually from a first surface to a second surface of the foil.

20. The flexible foil of claim 19, wherein the dye is splay oriented with a planar orientation near one major surface of the foil and a homeotropic orientation near another major surface opposite the one major surface.

* * * * *